US012056308B2

United States Patent
Li et al.

(10) Patent No.: US 12,056,308 B2
(45) Date of Patent: Aug. 6, 2024

(54) SENSING MODULE AND WEARABLE DEVICE HAVING SAME

(71) Applicant: Wuhan China Star Optoelectronics Semiconductor Display Technology Co., Ltd., Wuhan (CN)

(72) Inventors: Bo Li, Wuhan (CN); Wenxu Xianyu, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 17/262,763

(22) PCT Filed: Oct. 22, 2020

(86) PCT No.: PCT/CN2020/122675
§ 371 (c)(1),
(2) Date: Apr. 27, 2023

(87) PCT Pub. No.: WO2022/052221
PCT Pub. Date: Mar. 17, 2022

(65) Prior Publication Data
US 2023/0251737 A1    Aug. 10, 2023

(30) Foreign Application Priority Data

Sep. 9, 2020   (CN) .......................... 202010939924.3

(51) Int. Cl.
G06F 3/041    (2006.01)
A44C 5/00    (2006.01)
(Continued)

(52) U.S. Cl.
CPC ........ *G06F 3/04166* (2019.05); *A44C 5/0007* (2013.01); *G06F 3/0416* (2013.01);
(Continued)

(58) Field of Classification Search
CPC ................. G06F 3/0443; G06F 3/0446; G06F 3/041661; G06F 3/0416; G06F 3/04166;
(Continued)

(56) References Cited

U.S. PATENT DOCUMENTS

2017/0160819 A1\* 6/2017 Yi ............................. G06F 3/03
2017/0193265 A1   7/2017 Chan et al.
(Continued)

FOREIGN PATENT DOCUMENTS

CN      104133594 A       11/2014
CN      205486037 U   \*   8/2016
(Continued)

OTHER PUBLICATIONS

English Translation for CN205486037U, 2023, pp. 1-7 (Year: 2023).\*

*Primary Examiner* — Jimmy H Nguyen
(74) *Attorney, Agent, or Firm* — Menachem Nathan; Nathan & Associates

(57) ABSTRACT

A sensing module and a wearable device having same are disclosed. Wherein the sensing module comprises sensing electrodes, including a plurality of first sensing groups and a plurality of second sensing groups, wherein a width of the electrodes in the first sensing groups and a width of the electrodes in the second sensing groups are both less than a predetermined width; a driving chip, respectively connected to at least some of the first sensing groups and at least some of the second sensing groups. The driving chip has a fingerprint recognition function and a touch function.

18 Claims, 3 Drawing Sheets

(51) Int. Cl.
*G06F 3/044* (2006.01)
*G06V 40/13* (2022.01)

(52) U.S. Cl.
CPC ........ *G06F 3/0446* (2019.05); *G06V 40/1306* (2022.01); *G06F 2203/04111* (2013.01)

(58) Field of Classification Search
CPC ........ G06F 2203/04111; A44C 5/0007; G06V 40/1306
USPC ........................................................ 345/174
See application file for complete search history.

(56) References Cited

U.S. PATENT DOCUMENTS

| | | |
|---|---|---|
| 2017/0316249 A1* | 11/2017 | Lee .................... G06V 40/1306 |
| 2017/0364205 A1 | 12/2017 | Chang et al. |
| 2018/0059452 A1 | 3/2018 | Jang |
| 2019/0042018 A1* | 2/2019 | Kim ........................ G06F 3/044 |
| 2019/0187835 A1 | 6/2019 | Griffin |
| 2021/0019021 A1 | 1/2021 | Zhang |
| 2021/0141507 A1 | 5/2021 | Micci et al. |

FOREIGN PATENT DOCUMENTS

| | | |
|---|---|---|
| CN | 205486037 U | 8/2016 |
| CN | 107015710 A | 8/2017 |
| CN | 107068726 A | 8/2017 |
| CN | 109828696 A | 5/2019 |
| CN | 110036361 A | 7/2019 |
| CN | 110058735 A | 7/2019 |
| CN | 110568952 A | 12/2019 |

\* cited by examiner

SENSING MODULE AND WEARABLE DEVICE HAVING SAME

FIELD OF INVENTION

The present application relates to display technology, and specifically relates to a sensing module and a wearable device having same.

BACKGROUND OF INVENTION

With the rapid development of the Internet of things technology, the functions of intelligent electronic devices continue to expand. Compact and practical wearable devices are widely used for various applications, such as health monitoring, safe certification, and means of payment, due to their ability to connect mobile phones.

SUMMARY OF INVENTION

Technical Problems

However, conventional wearable devices have not be equipped with a fingerprint recognition function yet, and thus lead to a poor security of the conventional wearable devices.

Solution to the Problems

Technical Solution

The present application provides a sensing module and a wearable device for improving security of the wearable device.

The embodiments of the present application provide a sensing module, comprising:
sensors including:
a plurality of interconnected first sensing electrodes, wherein the plurality of first sensing electrodes are defined into a plurality of first sensing groups;
a plurality of second sensing electrodes disposed in alternation with the first sensing electrodes, wherein the plurality of second sensing electrodes are defined into a plurality of second sensing groups; wherein each of the first sensing electrodes has a first width defined between two opposite corners of the first sensing electrode, each of the second sensing electrodes has a second width defined between two opposite corners of the second sensing electrode, and the first width and the second width are less than a predetermined value; wherein the first sensing groups are arranged along a first direction, and the second sensing groups are arranged along a second direction; the first direction intersects with the second direction; and
a driving chip respectively connected to at least some of the first sensing groups and at least some of the second sensing groups, wherein the driving chip has a fingerprint recognition function and a touch function.

The present application also provides a wearable device, comprising: the sensing module described hereinabove.

BENEFICIAL EFFECTS OF INVENTION

Beneficial Effects

The sensing module and the wearable device of the embodiments of the present application comprise the sensors. The sensors include the plurality of interconnected first sensing electrodes defined into the plurality of first sensing groups, and the plurality of second sensing electrodes disposed in alternation with the first sensing electrodes and defined into the plurality of second sensing groups. The first distance defined between two opposite corners of each first sensing electrode and the second distance defined between two opposite corners of each second sensing electrode are both less than the predetermined width. The sensing module and the wearable device of the embodiments of the present application also comprise the driving chip which is respectively connected to at least some of the first sensing groups and at least some of the second sensing groups. The driving chip has the fingerprint recognition function and the touch function. Because the first distance of the first sensing electrodes and the second distance of the second sensing electrodes are set to be relative small, the fingerprint recognition function and the touch function may be achieved on the wearable device, and therefore the security of the wearable device is enhanced.

BRIEF DESCRIPTION TO DRAWINGS

Description of Drawings

In order to clearly illustrate the embodiments of the present application, the following briefly introduces the accompanying drawings used in the description of the embodiments. Obviously, the drawings in the following description merely show some of the embodiments of the present application. As regards one of ordinary skill in the art, other drawings may be obtained in accordance with these accompanying drawings without making creative efforts. In the drawings.

EMBODIMENTS OF INVENTION

Detailed Description of the Embodiments

The technical solutions in the embodiments of the present application are clearly and completely described as follows with reference to the accompanying drawings in the embodiments. It is apparent that the described embodiments are only a part of the embodiments of the present application, and not all of the embodiments. All other embodiments obtained by a person skilled in the art based on the embodiments of the present application without inventive efforts are within the scope of the present application.

In addition, the terms "first" and "second" are used for descriptive purposes only and are not to be construed as indicating or implying a relative importance or implicitly indicating the number of indicated technical features. Thus, features defining "first" or "second" may include one or more of the described features either explicitly or implicitly. In the description of the present application, the meaning of "a plurality of" is two or more unless specifically defined otherwise.

In the present application, it is noted that, unless otherwise explicitly set forth and defined, the terms "mount", "contact", and "connect" should be understood broadly, and, for example, may be fixedly connected, detachably connected, integrally connected, mechanically connected, electrically connected, directly connected, or indirectly connected through an intermediate medium, or internally communicated within two components. For those of ordinary skill in the art, the specific meaning of these terms in the present application should be understood on a basis of a specific case situation.

Figure 1:
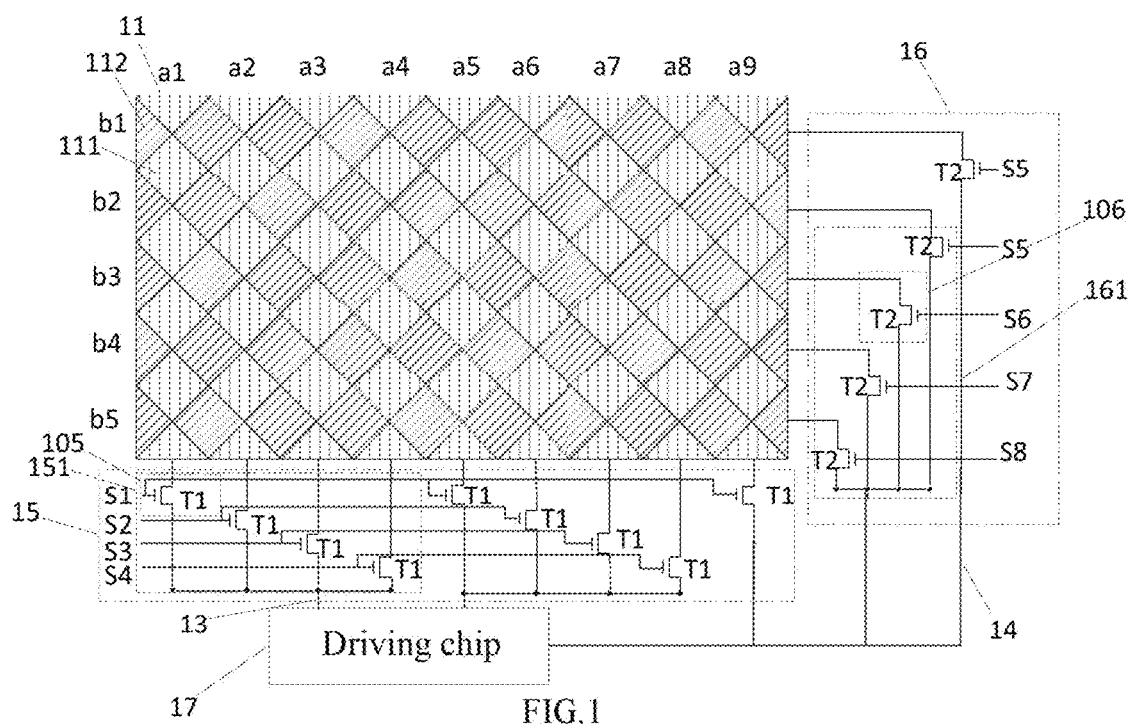
FIG. 1 is a structural schematic view of a sensing module provided by an embodiment of the present application.
Figure 2:
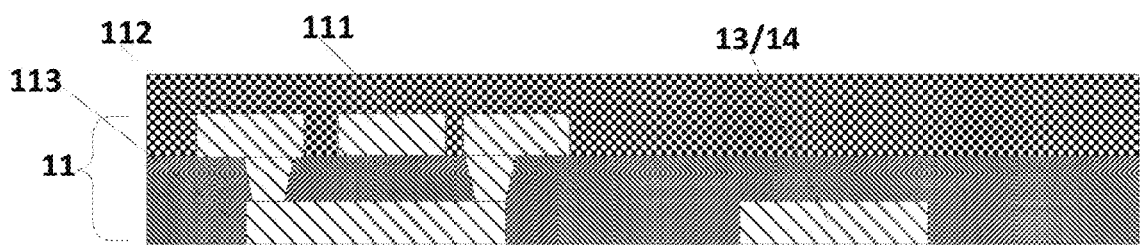
FIG. 2 is a sectional schematic view of a sensor provided by an embodiment of the present application.

Refer to FIG. 1 and FIG. 2. FIG. 1 is a structural schematic view of a sensing module provided by an embodiment of the present application.

As shown in FIG. 1, the sensing module 10 of the present embodiment comprises sensors 11 and a driving chip 17.

The sensors 11 include a plurality of interconnected first sensing electrodes 111 and a plurality of second sensing electrodes 112. The plurality of first sensing electrodes 111 are defined into a plurality of first sensing groups a1 to a9. The second sensing electrodes 112 are disposed in alternation with the first sensing electrodes 111. The plurality of second sensing electrodes 112 are defined into a plurality of second sensing groups b1 to b5. The first sensing groups are arranged along a first direction and the second sensing groups are arranged along a second direction. The first direction intersects with the second direction. Each of the first sensing electrodes has a first width defined between two opposite corners of the first sensing electrode, each of the second sensing electrodes has a second width defined between two opposite corners of the second sensing electrode, and the first width and the second width are less than a predetermined width for achieving a fingerprint recognition function and a touch function. In an implementation, the first width and the second width each range from 50 μm to 100 μm. The range of the first width of the first sensing electrode 111 is equal to the range of the second width of the second sensing electrode 112. Because sizes of the first sensing electrodes 111 and the second sensing electrodes 112 are set to be relative small, accuracy of fingerprint recognition and touch sensitivity of small size screens are enhanced.

The driving chip 17 is respectively connected to at least some of the first sensing groups and at least some of the second sensing groups. The driving chip 17 has the fingerprint recognition function and the touch function. That is, the driving chip 17 is integrated with the fingerprint recognition function and the touch function, thereby enhancing a degree of integration of the sensing module.

In an embodiment, to reduce a number of connecting wires, thereby reducing a frame size, the sensing module 10 further comprises a first control circuit 15. The first control circuit 15 includes a plurality of first control groups 151 and a plurality of first connecting wires 13. The first control groups 151 include a plurality of first control units 105. The first control units 105 correspond to the first sensing groups. Wherein, the first control unit 105 is inputted with first control signals and is respectively connected to a corresponding one of the first sensing groups and a corresponding one of the first connecting wires 13. A total number of the plurality of the first connecting wires 13 is less than a total number of the plurality of the first sensing groups. Take the first control group 151 which includes four first control units as an example. The total number of the first connecting wires 13 is 3 and the total number of the first sensing groups is 9. The first connecting wires 13 correspond to the first control groups 151, each connected to the driving chip 17 via the corresponding one of the first connecting wires 13. A number of the first control units in the first control group 151 is not limited to the number shown hereinabove. It is to be understood that each of the control units in the same control group may be inputted with different control signals.

In a preferred implementation, to enhance the accuracy of fingerprint recognition, each of the first control groups 151 corresponds to one of the first connecting wires 13. In other implementations, each of the first control groups 151 may corresponds to multiple first connecting wires 13.

In an implementation, the first control unit 105 includes a first switch component T1. An input end of the first switch component T1 is connected to a corresponding one of the first sensing groups, an output end of the first switch component T1 is connected to a corresponding one of the first connecting wires 13, and a control end of the first switch component T1 is inputted with the first control signals. The first control signals are one of S1 to S4.

In another embodiment, to further reduce the number of the connecting wires, thereby reducing the frame size, the sensing module 10 further comprises a second control circuit 16. In an implementation, the second control circuit 16 includes a plurality of second control groups 161 and a plurality of second connecting wires 14.

The second control groups 161 include a plurality of second control units 106. The second control units 106 correspond to the second sensing groups. The second connecting wires 14 correspond to the second control groups 161, each connected to the driving chip 17 via a corresponding one of the second connecting wires 14. A total number of the plurality of the second connecting wires 14 is less than a total number of the plurality of the second sensing groups. Take the second control group 161 which includes four second control units as an example. The total number of the second connecting wires 14 is 2 and the total number of the second sensing groups is 5.

In a preferred implementation, to enhance the accuracy of fingerprint recognition, each of the second control groups 161 corresponds to one of the second connecting wires 14. In other implementations, each of the second control groups 161 may corresponds to multiple second connecting wires 14.

Wherein, the second control unit 106 is inputted with second control signals and is respectively connected to a corresponding one of the second sensing groups and a corresponding one of the second connecting wires 14.

In an implementation, the second control unit 106 includes a second switch component T2. An input end of the second switch component T2 is connected to a corresponding one of the second sensing groups, an output end of the second switch component T2 is connected to a corresponding one of the second connecting wires, and a control end of the second switch component T2 is inputted with the second control signals. The second control signals are one of S5 to S8. A number of the second control units in the second control group 161 is not limited to the number shown hereinabove. It is to be understood that each of the control units in the same control group may be inputted with different control signals.

It is to be understood that the sensing module may comprises at least one of the first control circuit 15 or the second control circuit 16. Specific structures of the first control circuit 15 and the second control circuit 16 may be seen hereinabove.

As shown in FIG. 2, the sensor 11 may further include a connecting bridge 113, via which adjacent two of the second sensing electrodes 112 are connected. In an implementation, the connecting bridge 113 is disposed on a first conductive layer. The first connecting wires 13 and the second connecting wires 14 are also disposed on the first conductive layer. That is, the first connecting wires 13, the second connecting wires 14, and the connecting bridge 113 are disposed on the same layer and are made of same material.

The first sensing electrodes 111 and the second sensing electrodes 112 are disposed on a same layer and are made of same material. For example, the first sensing electrodes 111 and the second sensing electrodes 112 are disposed on a second conductive layer. An insulation layer (not shown) is disposed between the first conductive layer and the second conductive layer.

In an implementation, to enhance speed of response, driving chip 17 is respectively connected to some of the first sensing groups and some of the second sensing groups in response to the sensing module 10 in a touch mode.

In response to the sensing module 10 in a fingerprint recognition mode, the driving chip 17 is respectively connected to each of the first sensing groups and each of the second sensing groups. That is, the driving chip 17 is connected to all the first sensing groups and all the second sensing groups.

In a preferred implementation, in response to the sensing module in the touch mode, a number of the first sensing groups electrically connected to the driving chip 17 is less than or equal to half of the total number of the first sensing groups and a number of the second sensing groups electrically connected to the driving chip 17 is less than or equal to half of the total number of the second sensing groups. For example, four of the first sensing groups are electrically connected to the driving chip 17, which means only four of the first sensing groups are turned on and the rest of the first sensing groups are turned off, or two of the first sensing groups are electrically connected to the driving chip 17, which means only two of the first sensing groups are turned on and the rest of the first sensing groups are turned off. Because very accurate touch recognition is not needed during touch operation, scanning quantities of the first sensing groups and the second sensing groups are reduced, thereby enhancing response speed.

Because the first width and the second width are set be relatively small, the fingerprint recognition function and the touch function may be achieved on the wearable device, and therefore the security of the wearable device is enhanced.

Figure 3:
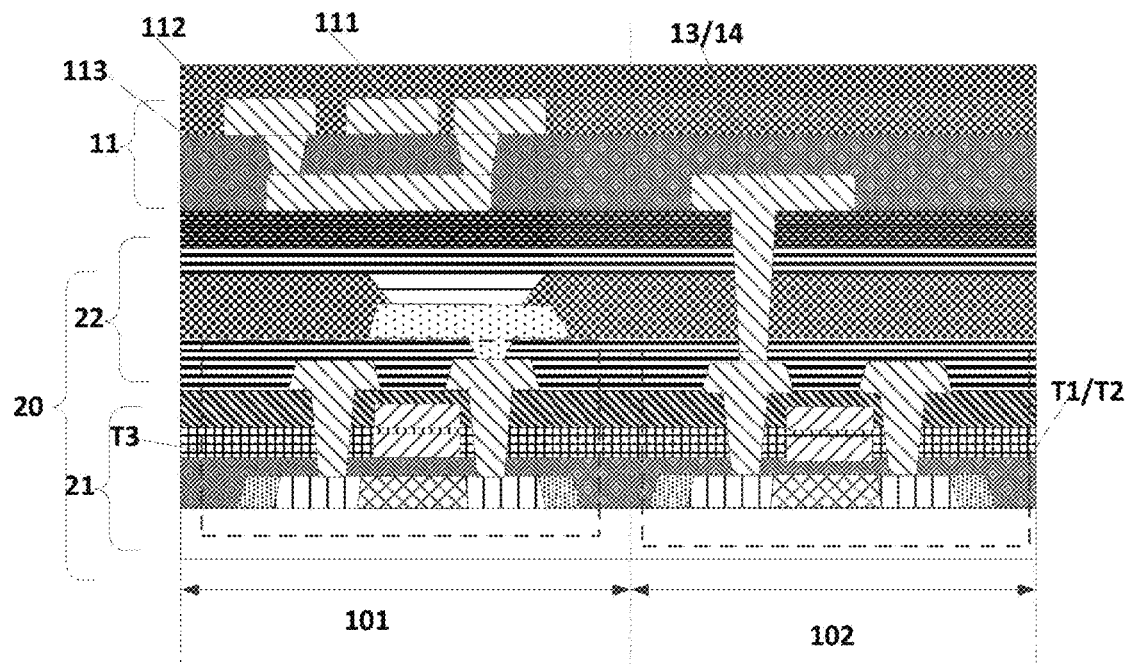
FIG. 3 is a sectional schematic view of a wearable device provided by an embodiment of the present application.

Refer to FIG. 3. FIG. 3 is a sectional schematic view of a wearable device provided by an embodiment of the present application.

As shown in FIG. 3, a wearable device 100 of the present embodiment comprises the aforementioned sensing module 10 and a display panel 20. In an implementation, the sensors 11 are disposed on the display panel 20. The wearable device 100 includes a pixel area 101 and a non-pixel area 102. The sensors 11 and the display panel 20 are in the pixel area 101 while the first control circuit and the second control circuit are in the non-pixel area 102.

The display panel 20 includes a plurality of third switch components T3. The third switch components T3, the first switch components T1, and the second switch components T2 are disposed on a same layer, thereby simplifying the manufacturing process, reducing costs, and reducing a thickness of the wearable device 100.

The display panel 20 may include a switch array layer 21 and a display portion 22. The switch array layer 21 may include the plurality of third switch components T3. In an implementation, the switch array layer 21 includes a cushioning layer, a semiconductor layer, a gate insulation layer, a gate electrode, a first insulation layer, a first metal layer, a second insulation layer, a second metal layer, a third insulation layer, and a planar layer. The second metal layer includes a source electrode and a drain electrode. Certainly, it should be understood that a structure of the switch array layer is not limit to the structure described hereinabove. The display portion 22 includes a plurality of light emitting units. In an implementation, the display portion 22 includes anodes, a light emitting layer, and cathodes. Certainly, it should be understood that a structure of the display portion 22 is not limit to the structure described hereinabove.

Figure 4:
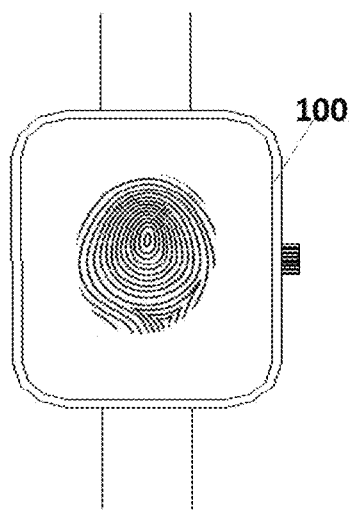
FIG. 4 is a structural schematic view of a wearable device provided by an embodiment of the present application preforming fingerprint recognition.

As shown in FIG. 4, in response to the reception of a fingerprint recognition command, sufficient finger touch on a screen of the wearable device 100 triggers the sensors in contact with the finger to generate a sensing electric signal. The sensing electric signal is translated into a fingerprint signal by a simulation digital translation process. A fingerprint verification is passed if the fingerprint signal matches a prestored fingerprint data.

Figure 5:
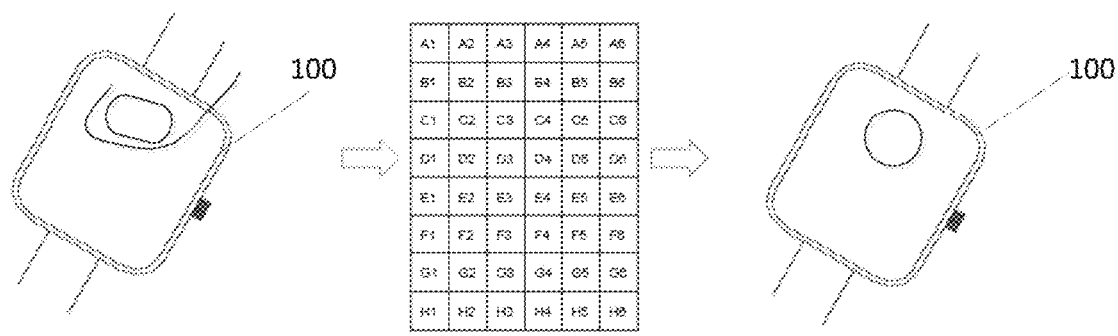
FIG. 5 is a structural schematic view of a wearable device provided by an embodiment of the present application in touch mode.

As shown in FIG. 5, in a touch scenario, because speed of finger touch operation is relative fast, the finger leaves the screen of the wearable device 100 immediately after tapping. In the scenario, electric signals generated by the sensors in contact with the finger also change. The sensors generating changed electric signals present corresponding coordinates. A finger touch area may be divided into several subareas numbered from A1 to H6. Changes of the electric signals in these subareas are determined as a touch point after the simulate digital translation process. Thereby, a touch range of the finger may be determined, and accurate touch may be achieved.

Figure 6:
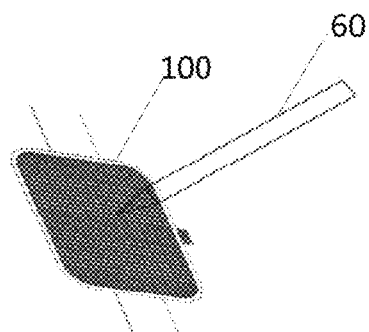
FIG. 6 is a structural schematic view of a wearable device provided by an embodiment of the present application been used with a stylus.

As shown in FIG. 6, because the sizes of the sensors are smaller, to achieve accurate touch recognition, the wearable device 100 of the present application may support a stylus 60. In response to a tip of the stylus 60 in contact with a surface of the screen, the signals generated by the sensors in an area in contact with the tip changes the most. In an adjacent area, the longer the distance from the tip, the lesser the variation of the signal. Thereby, the accurate identification of stylus operation may be achieved.

The wearable device described hereinabove is not limited to devices, such as smart bracelets and smart watches.

The sensing module and the wearable device of the embodiments of the present application comprises the sensors. The sensors include the plurality of interconnected first sensing electrodes defined into the plurality of first sensing groups, and the plurality of second sensing electrodes disposed in alternation with the first sensing electrodes and defined into the plurality of second sensing groups. The first distance defined between two opposite corners of each first sensing electrode and the second distance defined between two opposite corners of each second sensing electrode are both less than the predetermined width. The sensing module and the wearable device of the embodiments of the present application also comprises the driving chip which is respectively connected to at least some of the first sensing groups and at least some of the second sensing groups. The driving chip has the fingerprint recognition function and the touch function. Because the sizes of the first sensing electrodes and the second sensing electrodes are set to be relatively small, the fingerprint recognition function and the touch function may be achieved on the wearable device, and therefore the security of the wearable device is enhanced.

The sensing module and the wearable device having same provided in the embodiments of the present application are described in detail above. Specific embodiments are used herein to explain the principles and implementation of the present application. The above embodiments are used to assist in understanding this application. In addition, to those of ordinary skill in the art, the specific implementation and the range of application according to the idea of the present application may be altered. In summary, the content of the specification should not be constructed as limiting the application.

What is claimed is:

1. A sensing module, comprising:
    sensors including:
        a plurality of interconnected first sensing electrodes, wherein the plurality of first sensing electrodes are defined into a plurality of first sensing groups;
        a plurality of second sensing electrodes disposed in alternation with the first sensing electrodes, wherein the plurality of second sensing electrodes are defined into a plurality of second sensing groups; wherein each of the first sensing electrodes has a first width defined between two opposite corners of the first sensing electrode, each of the second sensing electrodes has a second width defined between two opposite corners of the second sensing electrode, and the first width and the second width are less than a predetermined width; wherein the first sensing groups are arranged along a first direction, and the second sensing groups are arranged along a second direction; the first direction intersects with the second direction; and
        a driving chip respectively connected to at least some of the first sensing groups and at least some of the second sensing groups, wherein the driving chip has a fingerprint recognition function and a touch function;
    wherein the sensor further includes a plurality of first connecting wires connecting the first sensing electrodes with the driving chip, a plurality of second connecting wires connecting the second sensing electrodes with the driving chip, and a connecting bridge; and adjacent two of the second sensing electrodes are connected via the connecting bridge; and
    the first connecting wires, the second connecting wires, and the connecting bridge are disposed on a same layer and are made of same material.

2. The sensing module as claimed in claim 1, wherein the first width and the second width each range from 50 µm to 100 µm.

3. The sensing module as claimed in claim 1, further comprising:
    a first control circuit including:
        a plurality of first control groups including a plurality of first control units corresponding to the first sensing groups; and
        the first connecting wires, wherein the first connecting wires correspond to the first control groups, and each of the first control groups is connected to the driving chip via a corresponding one of the first connecting wires;
    wherein the first control unit is inputted with first control signals and is respectively connected to a corresponding one of the first sensing groups and a corresponding one of the first connecting wires; wherein a total number of the first connecting wires is less than a total number of the first sensing groups.

4. The sensing module as claimed in claim 3, wherein each of the first control groups corresponds to one of the first connecting wires.

5. The sensing module as claimed in claim 3, wherein the first control unit includes a first switch component, wherein an input end of the first switch component is connected to a corresponding one of the first sensing groups, an output end of the first switch component is connected to a corresponding one of the first connecting wires, and a control end of the first switch component is inputted with the first control signals.

6. The sensing module as claimed in claim 3, further comprising:
    a second control circuit including:
        a plurality of second control groups including a plurality of second control units corresponding to the second sensing groups; and
        the second connecting wires, wherein the second connecting wires correspond to the second control groups, and each of the second control groups is connected to the driving chip via a corresponding one of the second connecting wires;
    wherein the second control unit is inputted with second control signals and is respectively connected to a corresponding one of the second sensing groups and a corresponding one of the second connecting wires; wherein a total number of the second connecting wires is less than a total number of the second sensing groups.

7. The sensing module as claimed in claim 6, wherein the second control unit includes a second switch component, wherein an input end of the second switch component is connected to a corresponding one of the second sensing groups, an output end of the second switch component is connected to a corresponding one of the second connecting wires, and a control end of the second switch component is inputted with the second control signals.

8. The sensing module as claimed in claim 6, wherein the driving chip is respectively connected to some of the first sensing groups and some of the second sensing groups in response to the sensing module in a touch mode; and
    the driving chip is respectively connected to each of the first sensing groups and each of the second sensing groups in response to the sensing module in a fingerprint recognition mode.

9. The sensing module as claimed in claim 8, wherein a number of the first sensing groups electrically connected to the driving chip is less than or equal to half of the total number of the first sensing groups, and a number of the second sensing groups electrically connected to the driving chip is less than or equal to half of the total number of the second sensing groups in response to the sensing module in the touch mode.

10. A wearable device, comprising a sensing module including:
    sensors including:
        a plurality of interconnected first sensing electrodes, wherein the plurality of first sensing electrodes are defined into a plurality of first sensing groups;
        a plurality of second sensing electrodes disposed in alternation with the first sensing electrodes, wherein the plurality of second sensing electrodes are defined into a plurality of second sensing groups; wherein each of the first sensing electrodes has a first width defined between two opposite corners of the first sensing electrode, each of the second sensing electrodes has a second width defined between two opposite corners of the second sensing electrode, and the first width and the second width are less than a predetermined width; wherein the first sensing groups are arranged along a first direction, and the second sensing groups are arranged along a second direction; the first direction intersects with the second direction; and a driving chip respectively connected to at least some of the first sensing groups and at least some of the second sensing groups, wherein the driving chip has a fingerprint recognition function and a touch function;

wherein the wearable device comprises a display panel disposed beneath the sensors;

the display panel comprises a plurality of third switch components; and the third switch components, first switch components, and second switch components are disposed on a same layer.

11. The wearable device as claimed in claim 10, wherein the first width and the second width each range from 50 μm to 100 μm.

12. The wearable device as claimed in claim 10, wherein the sensing module further includes:

a first control circuit including:

a plurality of first control groups including a plurality of first control units corresponding to the first sensing groups; and a plurality of first connecting wires corresponding to the first control groups, wherein each of the first control groups is connected to the driving chip via a corresponding one of the first connecting wires;

wherein the first control unit is inputted with first control signals and is respectively connected to a corresponding one of the first sensing groups and a corresponding one of the first connecting wires; wherein a total number of the first connecting wires is less than a total number of the first sensing groups.

13. The wearable device as claimed in claim 12, wherein each of the first control groups corresponds to one of the first connecting wires.

14. The wearable device as claimed in claim 12, wherein the first control unit includes a first switch component, wherein an input end of the first switch component is connected to a corresponding one of the first sensing groups, an output end of the first switch component is connected to a corresponding one of the first connecting wires, and a control end of the first switch component is inputted with the first control signals.

15. The wearable device as claimed in claim 12, wherein the sensing module further includes:

a second control circuit including:

a plurality of second control groups including a plurality of second control units corresponding to the second sensing groups; and a plurality of second connecting wires corresponding to the second control groups, wherein each of the second control groups is connected to the driving chip via a corresponding one of the second connecting wires;

wherein the second control unit is inputted with second control signals and is respectively connected to a corresponding one of the second sensing groups and a corresponding one of the second connecting wires; wherein a total number of the second connecting wires is less than a total number of the second sensing groups.

16. The wearable device as claimed in claim 15, wherein the second control unit includes a second switch component, wherein an input end of the second switch component is connected to a corresponding one of the second sensing groups, an output end of the second switch component is connected to a corresponding one of the second connecting wires, and a control end of the second switch component is inputted with the second control signals.

17. The wearable device as claimed in claim 15, wherein the driving chip is respectively connected to some of the first sensing groups and some of the second sensing groups in response to the sensing module in a touch mode; and the driving chip is respectively connected to each of the first sensing groups and each of the second sensing groups in response to the sensing module in a fingerprint recognition mode.

18. The wearable device as claimed in claim 17, wherein a number of the first sensing groups electrically connected to the driving chip is less than or equal to half of the total number of the first sensing groups and a number of the second sensing groups electrically connected to the driving chip is less than or equal to half of the total number of the second sensing groups in response to the sensing module in the touch mode.

* * * * *